(12) United States Patent
Xu et al.

(10) Patent No.: US 10,678,437 B2
(45) Date of Patent: Jun. 9, 2020

(54) METHOD AND DEVICE FOR MANAGING INPUT/OUTPUT (I/O) OF STORAGE DEVICE

(71) Applicant: EMC IP Holding Company LLC, Hopkinton, MA (US)

(72) Inventors: Tao Xu, Beijing (CN); Man Lv, Beijing (CN); Bing Liu, Tianjin (CN); James Lei Ni, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 15/629,011

(22) Filed: Jun. 21, 2017

(65) Prior Publication Data

US 2017/0364266 A1    Dec. 21, 2017

(30) Foreign Application Priority Data

Jun. 21, 2016  (CN) .......................... 2016 1 0454623

(51) Int. Cl.
*G06F 3/06* (2006.01)

(52) U.S. Cl.
CPC ............ *G06F 3/061* (2013.01); *G06F 3/0601* (2013.01); *G06F 3/0635* (2013.01); *G06F 3/0659* (2013.01); *G06F 3/0688* (2013.01); *G06F 3/0611* (2013.01)

(58) Field of Classification Search
CPC ............. G06F 3/00; G06F 13/24; G06F 13/36
See application file for complete search history.

(56) References Cited

U.S. PATENT DOCUMENTS

| 2002/0184423 | A1* | 12/2002 | Khan | G06F 13/26 710/260 |
| 2003/0163609 | A1* | 8/2003 | Abdo | G06F 3/0601 710/5 |
| 2005/0038940 | A1* | 2/2005 | Ido | G06F 3/0611 710/36 |
| 2006/0259665 | A1* | 11/2006 | Agarwala | G06F 13/28 710/62 |
| 2007/0067532 | A1* | 3/2007 | Tischler | G06F 13/161 710/240 |
| 2007/0233923 | A1* | 10/2007 | Lee | G06F 13/362 710/116 |

FOREIGN PATENT DOCUMENTS

CN          104951239         9/2015

* cited by examiner

*Primary Examiner* — Getente A Yimer
(74) *Attorney, Agent, or Firm* — BainwoodHuang (57) ABSTRACT

Embodiments of the present disclosure relate to a method and a device of managing input/output of a storage device. The storage device at least includes a first I/O port and a second I/O port. The method comprises receiving a first I/O request for the storage device, and determining a type of the first I/O request. Based on the type of the first I/O request, the first I/O request is dispatched to the first I/O port or the second I/O port. If the first I/O request is a read request, the first I/O request may be dispatched to the first I/O port, and if the first I/O request is determined as a write request, the first I/O request may be dispatched to the second I/O port. The method may reuse at least one of the first I/O port or the second I/O port.

13 Claims, 8 Drawing Sheets

METHOD AND DEVICE FOR MANAGING INPUT/OUTPUT (I/O) OF STORAGE DEVICE

RELATED APPLICATIONS

This application claim priority from Chinese Patent Application Number CN201610454623.5, filed on Jun. 21, 2016 at the State Intellectual Property Office, China, titled "METHOD AND DEVICE FOR MANAGING INPUT/OUTPUT (I/O) OF STORAGE DEVICE" the contents of which is herein incorporated by reference in its entirety.

FIELD

Embodiments of the present disclosure generally relate to a storage device, and more specifically, to a method and device for managing input/output (I/O) of a storage device.

BACKGROUND

With development of data storage technology, various data storage devices are capable of providing a user with a considerably increased data storage capability, and a data accessing speed is greatly improved. In a storage system, read and write speeds are key factors for determining the performance thereof. It usually takes different time to perform read and write operations, which varies with the different storage media. In a traditional mechanical disk (e.g., a magnetic disk, HDD), a speed difference between read and write operations are typically not significant. Therefore, the design of the traditional storage system does not take the difference between read and write into consideration. In recent years, as the solid state disk (SSD) develops rapidly, the SSD gradually replaces the traditional mechanical disk. In the SSD, read and write speeds are greatly distinct. As a result, if the difference between read and write is still not considered, severe influences may be caused on the performance of the storage system.

SUMMARY

Embodiments of the present disclosure provide a method and device for managing I/O of a storage device.

According to a first aspect of the present disclosure, a method of managing input/output (I/O) of a storage device is provided, the storage device at least including a first I/O port and a second I/O port. The method comprises: receiving a first I/O request for the storage device; dispatching the first I/O request based on a type of the first I/O request, comprising: in response to the first I/O request being a read request, dispatching the first I/O request to the first I/O port; and in response to the first I/O request being a write request, dispatching the first I/O request to the second I/O port.

According to a second aspect of the present disclosure, a device for use in cooperation with a storage device is provided, the storage device at least including a first I/O port and a second I/O port. The device comprises: at least one processing unit; and at least one memory which is coupled to the at least one processing unit and stores instructions executed by the at least one processing unit, the instructions, when executed by the at least one processing unit, cause the device to: receive a first I/O request for the storage device; dispatch the first I/O request based on a type of the first I/O request, comprising: in response to the first I/O request being a read request, dispatch the first I/O request to the first I/O port; and in response to the first I/O request being a write request, dispatching the first I/O request to the second I/O port.

According to a third aspect of the present disclosure, a device for use in cooperation with a storage device is provided, the storage device at least including a first I/O port and a second I/O port. The device comprises: a receive unit configured to receive a first I/O request for the storage device; a dispatch unit configured to dispatch the first I/O request based on a type of the first I/O request, the dispatch unit comprising: a first dispatch module configured to, in response to the first I/O request being a read request, dispatch the first I/O request to the first I/O port; and a second dispatch module configured to, in response to the first I/O request being a write request, dispatch the first I/O request to the second I/O port.

According to a fourth aspect of the present disclosure, a storage system is provided. The storage system comprises a plurality of storage devices, and one of the plurality of storage devices comprises a first I/O port and a second I/O port. The storage system further comprises a device for use in cooperation with the storage device according to the second aspect of the present disclosure or the device for use in cooperation with the storage device according to the third aspect of the present disclosure.

According to a fifth aspect of the present disclosure, a computer program product is provided, which is tangibly stored on a non-transitory computer readable medium and comprises machine readable instructions, the machine readable instructions, when executed, causing a machine to perform steps of the method according to the first aspect of the present disclosure.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent, wherein, identical reference numbers generally represent identical components in the example embodiments of the present disclosure.

DETAILED DESCRIPTION OF EMBODIMENTS

Preferred embodiments of the present disclosure will now be described in more detail with reference to the drawings; however, it should be appreciated that the present disclosure may be implemented in various manners but cannot be limited by the embodiments as described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another example" is to be read as "at least another one embodiment." The terms "first," "second," etc., may represent different or identical objects. Other explicit and implicit definitions may be included below.

As described above, a SSD typically has remarkably different read and write speeds, which is more severe in the case of rewrite. In a flash memory, the basic unit of the read and write operation is a page, while the basic unit of the erase operation is a block. Each block generally includes a plurality of pages. As an example, a number of pages within one block may be multiples of 16, for example 64, 128, or the like. It must be firstly erased prior to the rewrite operation. Moreover, if the area to be erased includes user data, it is necessary to transfer this portion of user data to other locations before erasing. Hence, the rewrite operation substantially involves complicated operations of multiple operations, and a granularity of the erase operation therein is remarkably larger than the granularity of the read operation, thereby significantly influencing the rewrite speed.

In a storage system, mixed workload (i.e., read and write are performed simultaneously) is a very common phenomenon. Due to the remarkable different read and write speeds, the mixed workload in an I/O path easily renders a read request delayed by a preceding write request. This is disadvantageous in a platform having a higher requirement on read and write performances.

Currently, most enterprise storage devices support two I/O ports. For example, both Serial Attached SCSI (SAS) interface and Non-Volatile Memory Express (NVMe) interface support two I/O ports. However, the two I/O ports are typically used in terms of redundancy. That is, only one I/O port is provided for read and write, and the other I/O port is generally in an idle state.

The SSD typically includes multiple protocol processing cores for processing I/O protocols and multiple chip control cores for controlling flash chips. In single-port read and write, it is possible that some of these cores are idle while some others are very busy. This results in inadequate allocation of resources, and may cause a delay in read.

It should be appreciated that, although the above is described in combination with SSD, there is a difference between read and write speeds to a certain extent in other storage media, like a traditional mechanical disk. Therefore, the present disclosure is not limited to specific types of storage devices in the bottom layer. Further, it should be appreciated that the present disclosure are not limited to the two protocols SAS and NVMe, and any other protocols supporting at least two I/O ports currently known or to be developed in the future are also applicable.

In order to solve the above and other potential problems, the example embodiments of the present disclosure propose a solution of managing a storage device. The solution uses the two I/O ports for read and write operations. As an example, one I/O port may be dedicated to the read operation, and the other I/O port is dedicated to the write operation, such that the operations are not influenced by each other. However, in a platform having a higher requirement on the read and write operations, one I/O port may be dedicated to the read operation, while the other I/O port may be used for both read and write operations.

Figure 1:
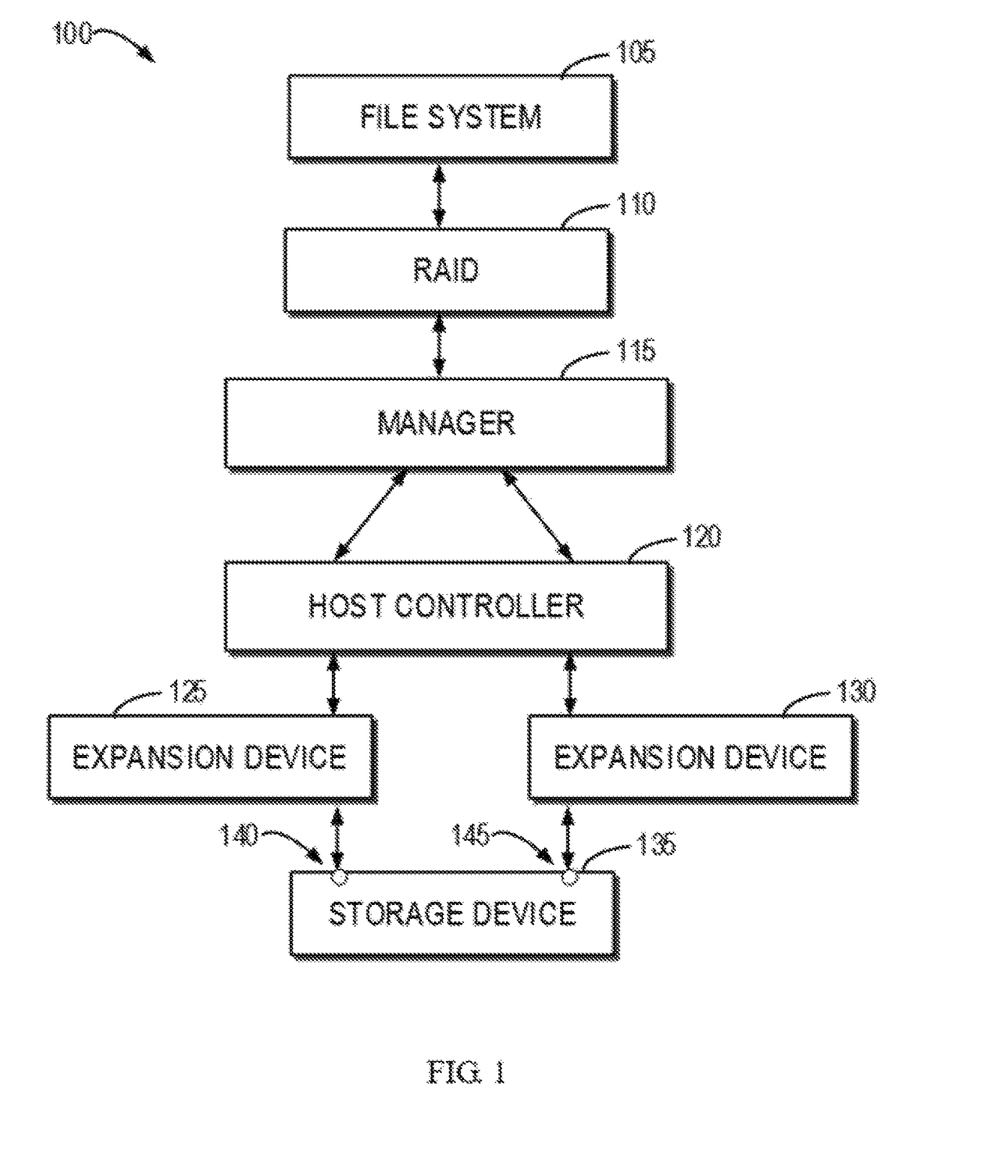
FIG. 1 is a block diagram illustrating a system for managing a storage device according to embodiments of the present disclosure.

FIG. 1 is a block diagram of a system 100 of managing a storage device according to embodiments of the present disclosure. It should be appreciated that the structure and function of the system 100 are described only for the purpose of illustration without suggesting any limitations as to the scope of the present disclosure. That is, some components in the system 100 may be omitted or replaced, while some other components not shown may be added to the system 100. The embodiments of the present disclosure may be embodied in different structures and/or functions.

As shown in FIG. 1, the system 100 may include a file system 105 which sends an I/O request to a respective volume in a redundant array of independent disk (RAID) 110. The RAID 110 sends the respective I/O request to a manager 115. The manager 115 may perform multiple functions, for example dispatching the I/O path and sending the I/O request to the dispatched I/O path. The manager 115 may also perform protocol layer processing to parse the I/O request. The parsed I/O request is sent to a host controller 120 which transmits control commands to respective expansion devices 125 and 130. As an example, the host controller in an SAS protocol may be called a host bus adapter (HBA), while the host controller in an NVMe protocol may be called a host.

The expansion devices 125 and 130 are connected to a storage device 135 respectively via the I/O ports 140 and 145. The expansion devices 125 and 130 are devices used to expand multiple storage devices. As an example, the expansion device may be called an expander in the SAS protocol, while the expansion device may be called a switch in the NVMe protocol. It should be appreciated that, although FIG. 1 only shows a storage device 135, the expansion devices 125 and 130 typically support a plurality of storage devices. For the sake of clarity, other storage devices are omitted herein.

The storage device 135 may store various data. Particularly, according to embodiments of the present disclosure, the storage device 135 at least includes two I/O ports, i.e., a first I/O port 140 and a second I/O port 145. As described above, the storage device 135 may be various types of storage media currently known or to be developed in the future, including, but not limited to, HDD, flash storage SSD, phase change memory medium (PCM) SSD, etc. The storage device 135 may receive read and write commands via the I/O ports 140 and 145, and perform read and write operations. Based on the read and write operations, the data in the storage device 135 may be transmitted upwards sequentially.

It should be appreciated by those skilled in the art that the processing flow in a multilayer processing architecture as illustrated in FIG. 1 is not necessarily implemented in an order as shown therein, and some flows may even be implemented in parallel. Moreover, the functions implemented in one module may be implemented in different modules, and functions implemented in different modules may be combined together. For example, the manager 115 may include a dispatcher (not shown).

Those skilled in the art should understand that the system as shown in FIG. 1 is not only a hardware architecture, and may be a mixed architecture including hardware and hierarchical signal processing. For example, the file system 106, RAID 110, manager 115, host controller 120 may be implemented by software.

Figure 2:
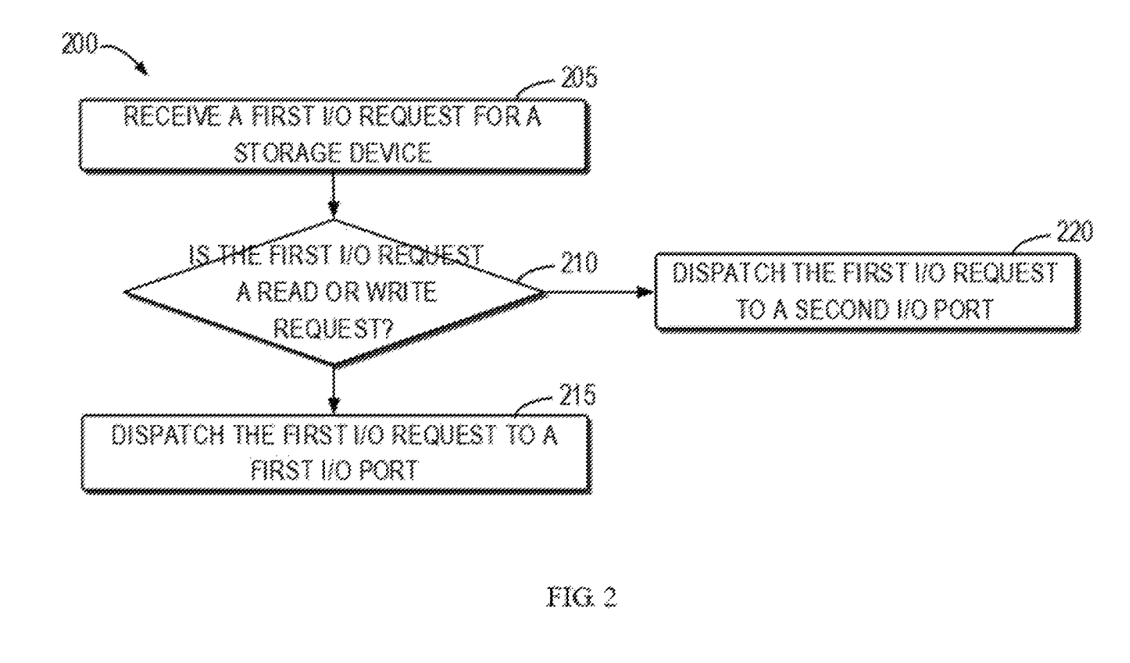
FIG. 2 is a flowchart illustrating a method of managing a storage device according to embodiments of the present disclosure.

Example embodiments of the present disclosure are further detailed below with reference to FIGS. 2-7. FIG. 2 is a flowchart illustrating a method 200 of managing a storage device 135 according to embodiments of the present disclosure. As described above, the storage device 135 at least includes a first I/O port 140 and a second I/O port 145. For example, the method 200 may be implemented by the manager 115 as shown in FIG. 1 (more specifically, the dispatcher within the manager 115). It should be appreciated that the method may include additional steps not shown and/or may skip some of the steps as shown, and the scope of the present disclosure is not limited in this aspect.

In step 205, an I/O request for the storage device 135 is received. For convenience of discussion, the I/O request is called a first I/O request. As a response, the manager 115 dispatches the I/O request among a plurality of I/O ports based on the type of the first I/O request received in step 205. For the sake of convenience, assume that the first I/O port 140 is arranged to be dedicated to processing a read request, and the second I/O port 145 is arranged to be dedicated to processing a write request.

Specifically, in step 210, it is determined whether the first I/O request is a read request or a write request. If the first I/O request is determined to be a read request, the method 200 moves to step 215 in which the first I/O request is dispatched to the first I/O port. On the other hand, if the received first I/O request is determined to be a write request in step 210, the first I/O request is dispatched to the second I/O port in step 220.

In the method 200, since the read request and the write request are dispatched to different I/O ports, there is no unnecessary sequence between the read and write, and unnecessary mutual interference is reduced when the storage device is processing the request, thereby improving the read and write performances of the storage device, particularly the read and write performances of the storage device (e.g., SSD) which exhibits a big difference in the read and write performances.

In some embodiments, although the first I/O port 140 and the second I/O port 145 are assigned with respective applications, the manager 115 may reuse the first I/O port 140 and/or the second I/O port 145 based on priorities of the read operation and the write operation in the storage device 135. The term "reuse" used herein indicates that the first I/O port is used to process another type of I/O operation on the basis of the inherent dedicated function thereof. In other words, the reused I/O port may process two different types of I/O requests, namely the read request and the write request.

According to embodiments of the present disclosure, which of the read operation and the write operation has a higher priority on the storage device 135 may be determined based on various factors. As an example, certain storage systems applied to indexing have a remarkably higher requirement on a delay performance of the read operation than the write operation. At this time, it may be determined that the priority of the read operation is higher than that of the write operation.

Alternatively or additionally, the priorities of the read operation and the write operation may be dynamically adjusted based on a load condition. For example, when the number of read operations is larger than the number of write operations, or when the number by which the number of read operations is larger than the number of write operations satisfies a predetermined threshold condition, it may be determined that the priority of the read operation is higher than that of the write operation. Therefore, the priorities of the read and write operations are determined based on the requirement of the real-time read and write states of the storage system, to optimize the storage system in real time.

It would be appreciated that the factor for determining the priority of the I/O operation, as described above, is only illustrative and not intended to limit the embodiments of the present disclosure in any manner. In other embodiments, the priorities of the read and write operations may be determined based on other conditions. Moreover, in some embodiments, the priority of the I/O operation of the storage device 135 may be determined and fixed in advance, and for example designated by the user. Optionally, in some other embodiments, the priority of the I/O operation may be altered dynamically.

Subsequent to determining the priority of the I/O operation of the storage device 135, the I/O port is reused based on the priority. Assume that the priority of the read operation of the storage device 135 is higher than that of the write operation. At this time, upon receiving a read request (also called "a second I/O request"), it may be dispatched to the second I/O port 154, which is originally dedicated to the write operation. In this way, the second I/O port 145 is reused. On the other hand, if the write operation of the storage device 135 has a higher priority than the read operation, the received write request (called "a third I/O request") is dispatched to the first I/O port 140, which is originally dedicated to the read operation. In this way, the first I/O port 140 is reused.

According to embodiments of the present disclosure, reusing may be performed in various appropriate manners. Taking the read request as an example, in one embodiment, only when the load of the first I/O port 140 dedicated to processing the read operation exceeds a predetermine threshold, the received read request is dispatched to the second I/O port 145. Alternatively, in some other embodiments, the received request may be dispatched between the first and second I/O ports 140 and 145 alternatively. So does the write request.

The embodiment may fully utilize throughputs of the two I/O ports of the storage device to improve the read and write performances. In the case of using the dedicated I/O port, interference between the read and write may also be reduced, thereby further enhancing the delay performance of the read or write in the dedicated I/O port.

In addition to or as an alternative to the embodiment as described above, the manager 115 may determine the performances of the I/O paths associated with the multiple I/O ports 140, 145 of the storage device 135. The term "/O path" as used herein indicates a path that the I/O request passes through before reaching the I/O port of the storage device. For example, in the system 100 of FIG. 1, the I/O path may refer to a path from the manager 115 to each of the I/O ports. As an example, the performance of one I/O path may be determined based on respective hopping levels of the I/O paths. The I/O path will be described below with reference to FIGS. 3*a* and 3*b*.

Figure 3A:
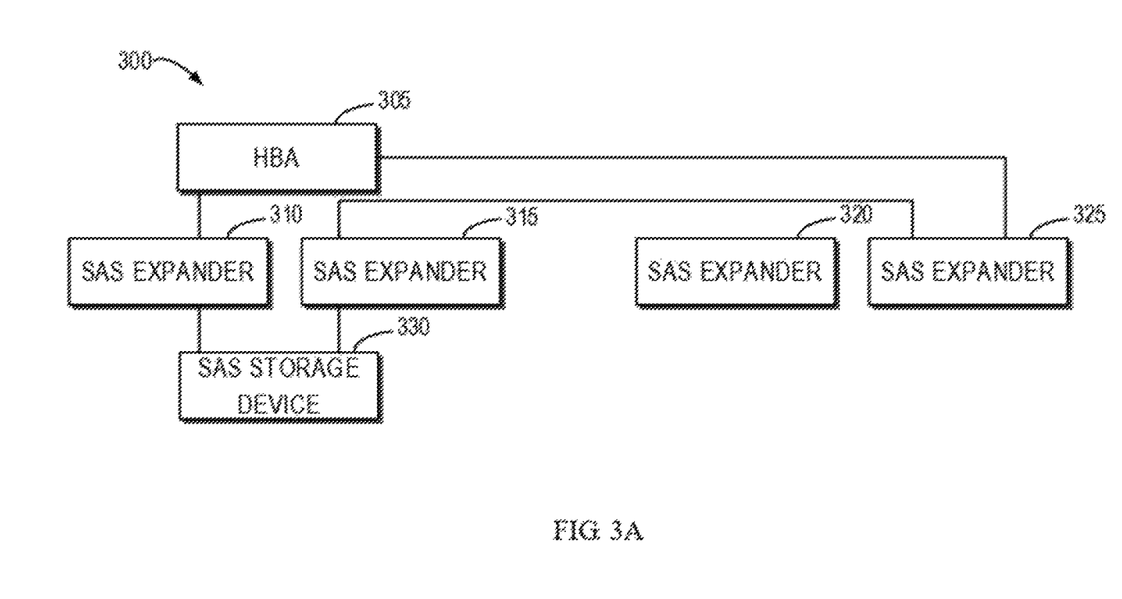
FIG. 3a is a diagram illustrating connection topology of a storage device including Serial Attached Small Computer System (SAS) interfaces according to embodiments of the present disclosure.

FIG. 3*a* is a diagram illustrating connection topology of a storage device including an SAS interface (hereinafter abbreviated as SAS storage device) 330 according to embodiments of the present disclosure. As shown in FIG. 3*a*, the SAS storage device 330 includes two I/O ports. The first I/O port is connected to the HBA 305 via the SAS expander 310, and the second I/O port is connected to the HBA 305 via the SAS expanders 315 and 325. For simplification, only one HBA is shown to be connected to two SAS expanders in FIG. 3*a*. However, it is not limited that two HBAs are used to be connected to two SAS expanders, respectively. The SAS expander 320 is shown for the sake of completeness and is connected to other storage devices (not shown) together with the SAS expander 325. As shown, the HBA is connected to the storage device only via an expander in the first I/O path, while the HBA is connected to the storage device via two expanders in the second I/O path. Therefore, the hopping levels of the two I/O paths are 1 and 2, respectively.

Figure 3B:
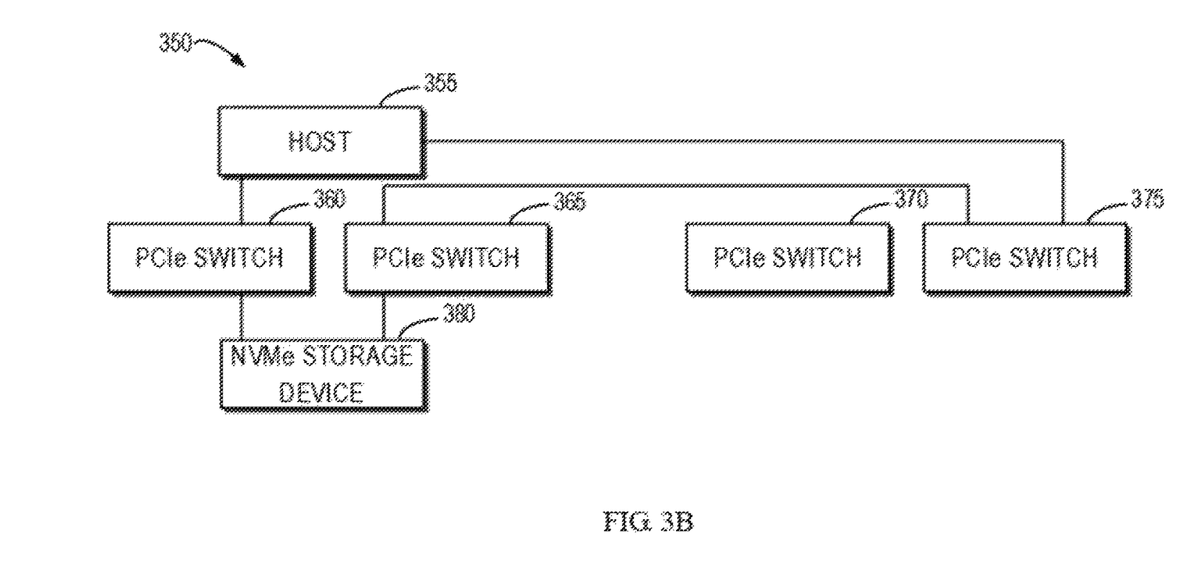
FIG. 3b is a diagram illustrating connection topology of a storage device including Non-Volatile Memory Express (NVMe) interface according to embodiments of the present disclosure.

Similarly, FIG. 3*b* is a diagram illustrating connection typology of a storage device including an NVMe interface (hereinafter abbreviated as NVMe storage device) 380 according to embodiments of the present disclosure. As shown in FIG. 3*b*, the NVMe storage device 380 includes two I/O ports. The first I/O port is connected to the host 355 via a PCI Express (PCIe) switch 360, while the second I/O port is connected to the host 355 via the PCIe switches 365 and 375. For simplification, only one host is shown to be connected to two PCIe switches in FIG. 3*b*. However, it is not limited that two host controllers are respectively connected to two PCIe switches. The PCIe switch 370 is shown for the sake of completeness and is connected to other storage devices (not shown) together with the PCIe 375 switch. As shown, the host is connected to the storage device only via a switch in the first I/O path, while host is connected to the storage device via two switches in the second I/O path. Therefore, the hopping levels of the two I/O paths are 1 and 2, respectively.

It is proved by experiment that for SSD of the SAS interface, input/output per second (IOPS) between the hopping levels of 1 and 3 typically has a difference of at least 10%. A plurality of SSDs in the same expansion device may easily cause a link bandwidth to be saturated, and it therefore is necessary to use the two I/O paths simultaneously. Moreover, as the difference between the hopping levels may result in a difference between read and write performances, selecting the I/O port or the I/O path based on the hopping levels may further optimize the read and write performances. It should be noted that, although the performance of the I/O path is illustrated by an example of the hopping level, other methods for determining the performance of the I/O path are also feasible, and the scope of the present disclosure is not limited in this aspect.

After determining the performances of the I/O paths, at least one of the first I/O port 140 and the second I/O port 145 may be selected based on the performances of the I/O paths. In some embodiments, if the read operation on the storage device 135 has a higher priority than the write operation, the I/O port associated with the I/O path having a higher performance may be selected from the multiple I/O ports as the first I/O port 140. On the other hand, if the write operation of the storage device 135 has a priority higher than the read operation, the I/O port associated with the I/O path having a higher performance is selected from the multiple I/O ports as the second I/O port 145.

Figure 4:
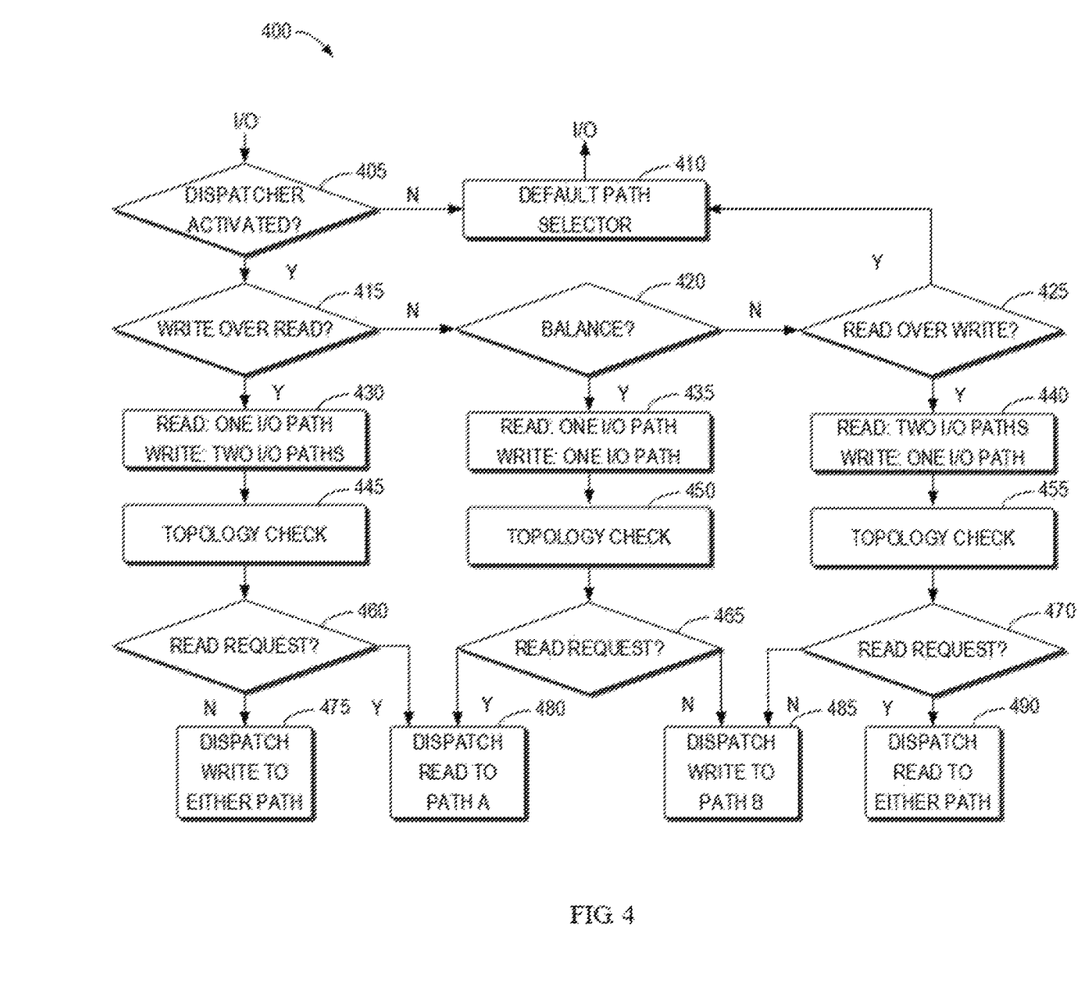
FIG. 4 is a flowchart of another method of managing a storage device according to embodiments of the present disclosure.

In order to enable those skilled in the art to better understand and implement the present disclosure, a method 400 of managing a storage device 135 will now be described in detail with reference to FIG. 4. The method 400 for example may be implemented in the manager 115 as shown in FIG. 1 or the dispatcher in the manager 115. The method 400 may be interpreted as a specific implementation of the method 200. It should be appreciated that the method 400 may further include additional steps not shown and/or may skip some of the steps as shown, and the scope of the present disclosure is not limited in this aspect. It should also be appreciated that the order of some steps in the method 400 may be altered and some steps may be implemented in parallel, and the scope of the present disclosure is not limited in this aspect.

In step 405, the I/O request is received and it is determined whether the dispatcher is enabled. If not enabled, the method 400 moves to step 410. In step 410, a default path selector is enabled. The default path selector may be a traditional path selector, for example, to dispatch all I/O requests to an I/O port but place the other I/O port in an idle state for the sake of redundancy.

If it is determined that the dispatcher is enabled in step 405, the method 400 moves to step 415. In step 415, it is determined whether the write operation is superior to the read operation, i.e., whether the write operation has a higher priority than the read operation. If the write operation does not have a higher priority than the read operation, the method 400 moves to step 420. In step 420, it is determined whether the read and write operations are balanced, i.e., whether the read and write operations have the same priority. If the priorities are different, the method moves to the step 425. In step 425, it is determined whether the read operation is superior to the write operation, i.e., whether the read operation has a higher priority than the write operation. If the read operation does not have a higher priority than the write operation, it is implied that priorities of the read and write operations are probably not set in the method. Hence, the method 400 may move to step 410, and the default path selector is enabled accordingly. It would be appreciated that the order of steps 415, 420 and 425 may be arranged arbitrarily. Optionally, these steps may be omitted, and read and write priorities are predetermined correspondingly.

Now refer back to step 415 for description. If it is determined in step 415 that the write is superior to the read, the method 400 moves to step 430. At this time, as the write operation has a higher priority, two I/O ports (or two I/O paths) are dispatched to the write request and one I/O port (or I/O path) is dispatched to the read request. In other words, one I/O port is dedicated to the write operation, and one I/O port is provided for both read and write operations. Then, the method 400 moves to step 445 to perform a typology check. The typology check is intended to determine the performance of the I/O path, for example, to determine the hopping level of the I/O path in some embodiments. In step 445, if it is determined that the first I/O path associated with the first I/O port has a higher performance, the first I/O path may be dedicated to the write operation, and the second I/O path having a lower performance may be provided for both read and write operations. Subsequent to the typology check, the method 400 moves to step 460 to determine whether the I/O request is a read request. If the I/O request is determined to be a read request, it may be dispatched to the second I/O path (i.e., the I/O path A in FIG. 4) in step 480. If the I/O request is determined to be a write request, it may be dispatched to any of the I/O paths in step 475.

Now refer back to step 420 for description. If it is determined in step 420 that the read and write are balanced, the method 400 moves to step 435. At this time, as the read and write share the same priority, one I/O port (or one I/O path) is dispatched respectively to the read request and the write request. In other words, one I/O port is dedicated to the write operation, and one I/O port is dedicated to the read operation. Next, the method 400 moves to step 450 to perform a typology check. As described above, the typology check is performed to determine the performance of the I/O path, and step 460 therefore may be omitted. After the typology check, the method 400 moves to step 465 to determine whether the I/O request is a read request. If the I/O request is determined to be a read request, it may be dispatched to the I/O path A in step 480. If the I/O request is determined to be a write request, it may be dispatched in step 485 to another I/O path, i.e., I/O path B.

Now refer back to step 425 for description. If it is determined that the write is superior to the read in step 425, the method 400 moves to the step 440. At this time, since the read operation has a higher priority, two I/O ports (or two I/O paths) are dispatched to the read request, and one I/O port (or one I/O path) is dispatched to the write request. In other words, one I/O port is dedicated to the read operation, and one I/O port is provided for both read and write operations. Then, the method 400 moves to step 455 to perform a typology check. As described above, the typology check is performed to determine the performance of the I/O path.

In certain embodiments, in step 445, if the first I/O path associated with the first I/O port is determined to have a higher performance, the first I/O path is dedicated to the read operation, and the second I/O path having a lower performance is provided for both read and write operations. Subsequent to the typology check, the method 400 moves to step 470 to determine whether the I/O request is a read request. If the I/O request is determined to be a read request, it may be dispatched to any of the I/O paths in step 489. If the I/O request is determined to be a read request, it may be dispatched in step 485 to the second I/O path (i.e., the I/O path B in the figure).

Figure 5A:
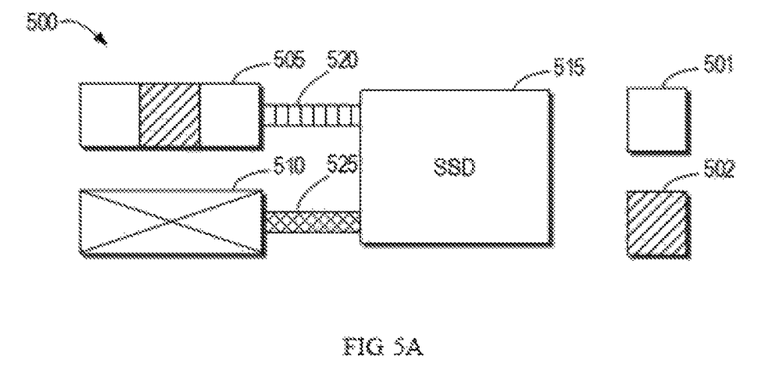
FIGS. 5a-5c are diagrams illustrating different read and write configurations according to embodiments of the present disclosure.
Figure 5B:
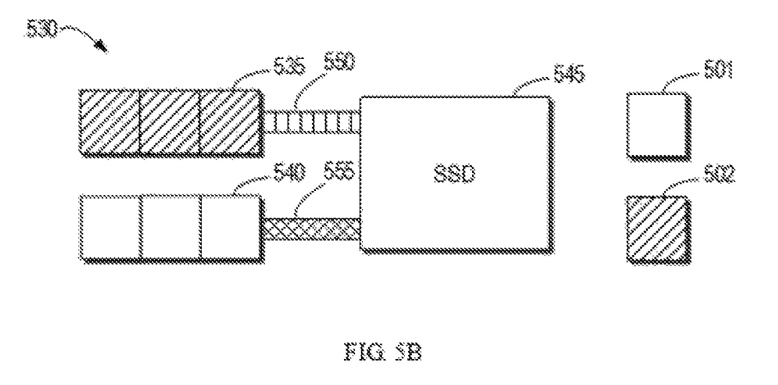
Figure 5C:
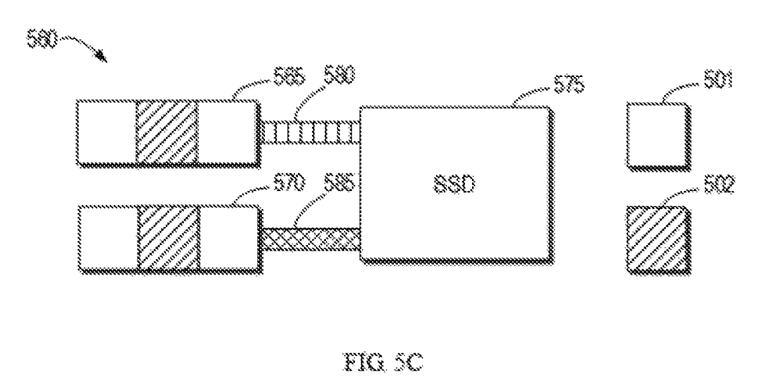

The advantageous effects of the embodiments of the present disclosure will be introduced below with reference to FIGS. 5a-5c. FIGS. 5a-5c are diagrams illustrating different read and write configurations, in which FIG. 5a illustrates a single port read and write configuration 500 according to the prior art, and FIGS. 5b and 5c respectively illustrate a dedicated read and write configuration 540 and a dual-port mixed read and write configuration 580. In FIGS. 5a-5c, the write request is represented with a pattern 501 (a blank box), and the read request is represented with a pattern 502 (a shadow box).

For simplification, FIGS. 5a-5c respectively show a sequence including three requests. As shown in FIG. 5a, the I/O request 505 is a mixed I/O requests including one read request and two write requests. The I/O request 505 is coupled via the I/O path 520 to the SSD 515. However, the I/O request 510 does not exist, i.e., the I/O path 525 is in an idle state. As shown in FIG. 5b, the I/O request 535 includes three read request and is coupled via the I/O path 550 to the SSD 545. The I/O request 540 includes three write requests and is coupled via the I/O path 555 to the SSD 545. As shown in FIG. 5c, both the I/O requests 565 and 570 include a write request and two read requests, i.e., both are mixed I/O requests. The I/O requests 565 and 570 are coupled to the SSD 575 respectively via the I/O paths 580 and 585.

In a read and write case of an 8K block file, three circumstances are tested, and the following test results are obtained, as shown in Table 1. As compared to the configuration 500 in the prior art, the configuration 550 and configuration 560 have significant improvements in read latency. Particularly in the solution 540, as a dedicated I/O port is assigned to the read request, the interference of the write request is reduced drastically, thereby greatly decreasing the latency of the read request.

TABLE 1

| Configuration | 500 | 530 | 560 |
|---|---|---|---|
| Read latency | 1258 µs | 564 µs | 739 µs |
| Write latency | 229 µs | 221 µs | 183 µs |

Figure 6:
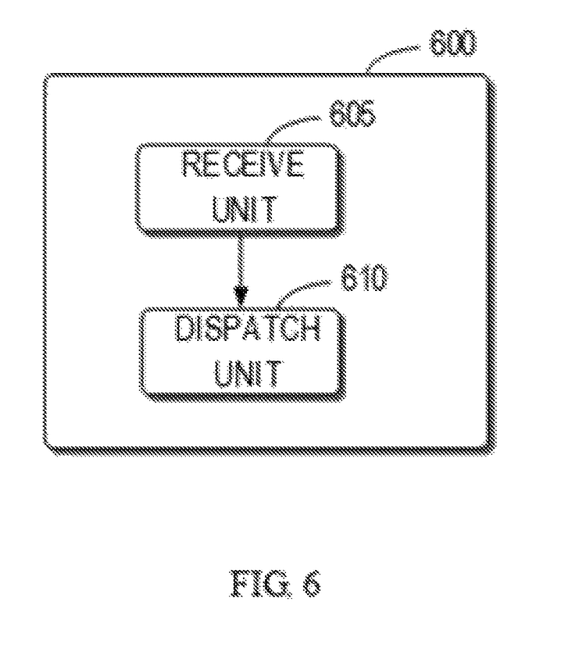
FIG. 6 is a block diagram illustrating a device for managing a storage device according to embodiments of the present disclosure.

FIG. 6 is a block diagram illustrating a device 600 of managing a storage device 135 according to embodiments of the present disclosure. The manager in FIG. 1 may be partly implemented by the device 600. For example, the device 600 may be implemented at the manager 115, or may act as the manager 115.

As shown in FIG. 6, the device 600 may include a receive unit 605 and a dispatch unit 610. The receive unit 605 is configured to receive the first I/O request for the storage device. The dispatch unit 610 is configured to dispatch the first I/O request based on the type of the first I/O request. The dispatch unit 610 may include a first dispatch module configured to, in response to the first I/O request being a read request, dispatch the first I/O request to the first I/O port. The dispatch unit 610 may include a second dispatch module configured to, in response to that the first I/O request being a write request, dispatch the first I/O request to the second I/O port.

In some embodiments, the device 600 may further include a reusing unit configured to reuse at least one of the first I/O port and the second I/O port based on priorities of a read operation and a write operation on the storage device.

Alternatively or additionally, in some embodiments, the reusing unit may be configured to: receive a second I/O request, the second I/O request being a read request; and in response to determining that the read operation of the storage device has a higher priority than the write operation, dispatch the second I/O request to the second I/O port.

Alternatively or additionally, in some embodiments, the reusing unit may be configured to: receive a third I/O request, the third I/O request being a write request; and in response to determining that the write operation of the storage device has a higher priority than the read operation, dispatch the third I/O request to the first I/O port.

Alternatively or additionally, in some embodiments, the device 600 may further include: a performance determining module configured to determine performances of I/O paths associated with a plurality of I/O ports of the storage device; and a selection module configured to select at least one of the first I/O port or the second I/O port based on the performances of the I/O paths.

Alternatively or additionally, in some embodiments, the selection module is configured to, in response to that the read operation of the storage device has a higher priority than the write operation, select, from the plurality of I/O ports, an I/O port associated with an I/O path having a higher performance as the first I/O port.

Alternatively or additionally, in some embodiments, the selection module may be configured to, in response to that the write operation of the storage device has a higher priority than the read operation, select, from the plurality of I/O ports, an I/O port associated with an I/O path having a higher performance as the second I/O port.

Alternatively or additionally, in some embodiments, the determination module may be configured to determine the performance based on respective hopping levels of the I/O paths.

Figure 7:
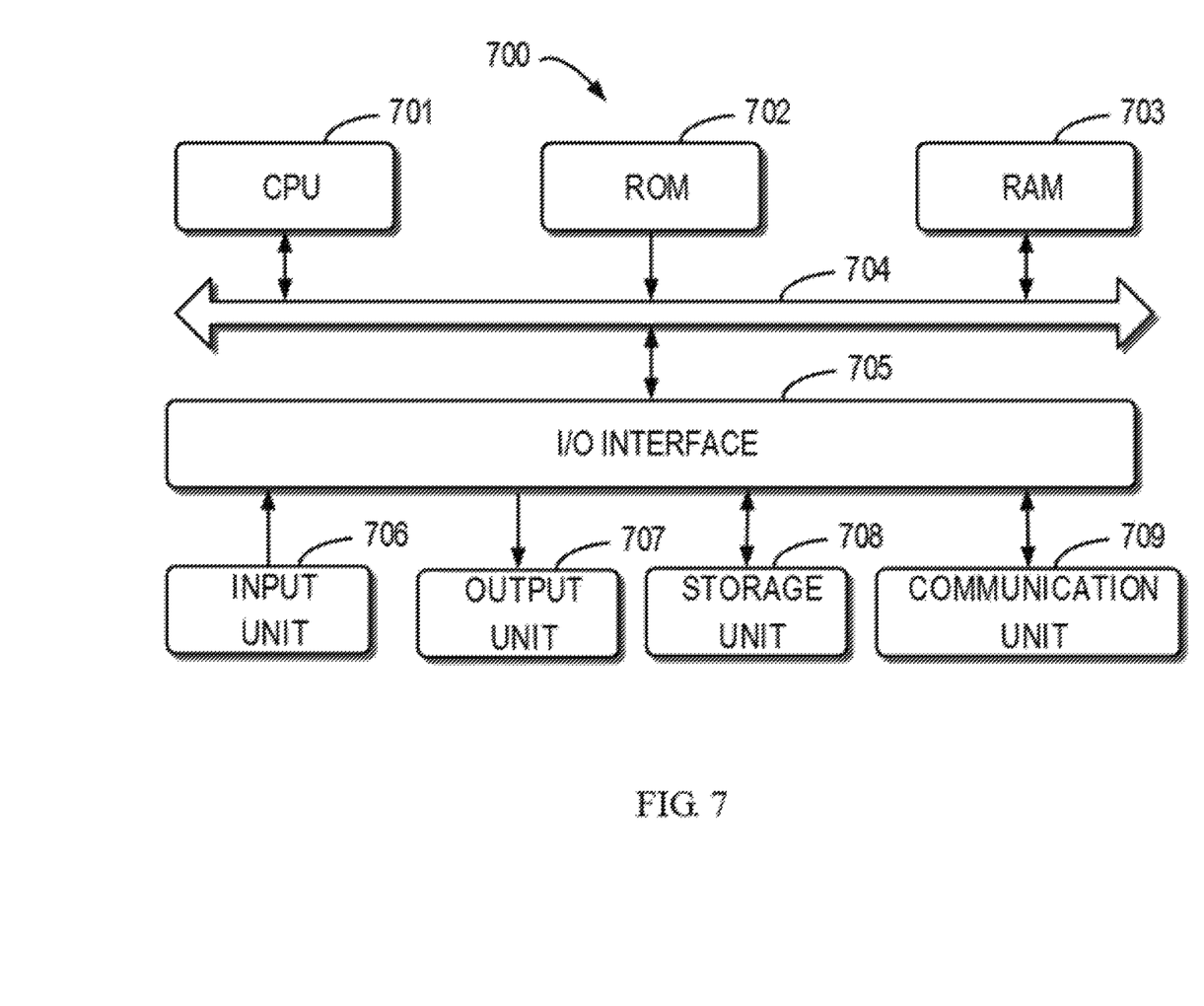
FIG. 7 is a block diagram illustrating an example device according to embodiments of the present disclosure.

FIG. 7 is a block diagram illustrating a device 700 adapted to implement embodiments of the present disclosure. As shown in FIG. 7, the device 700 comprises a central processing unit (CPU) 701 that may perform various appropriate actions and processing based on computer program instructions stored in a read-only memory (ROM) 702 or computer program instructions loaded from a storage section 708 to a random access memory (RAM) 703. In the RAM 703, there further store various programs and data needed for operations of the device 700. The CPU 701, ROM 702 and RAM 703 are connected to each other via a bus 704. An input/output (I/O) interface 705 is also connected to the bus 704.

The following components in the device 700 are connected to the I/O interface 705: an input 706 such as a keyboard, a mouse and the like; an output unit 707 including various kinds of displays and a loudspeaker, etc.; a memory unit 708 including a magnetic disk, an optical disk, and etc.; a communication unit 709 including a network card, a modem, and a wireless communication transceiver, etc. The communication unit 709 allows the device 700 to exchange information/data with other devices through a computer network such as the Internet and/or various kinds of telecommunications networks.

Various processes and processing described above, e.g., the method 200 or 400, may be executed by the processing unit 701. For example, in some embodiments, the method 200 or 300 may be implemented as a computer software program that is tangibly embodied on a machine readable medium, e.g., the storage unit 708. In some embodiments, part or all of the computer programs may be loaded and/or mounted onto the device 700 via ROM 702 and/or communication unit 709. When the computer program is loaded to the RAM 703 and executed by the CPU 701, one or more steps of the method 200 or 400 as described above may be executed.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), flash medium SSD, PCM SSD, 3D Xpoint, a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing an input/output (I/O) of a storage device, the storage device at least including a first I/O port and a second I/O port, the method comprising:
   receiving a first I/O request for the storage device;
   selectively dispatching the first I/O request to the first I/O port or the second I/O port based on whether the first I/O request is a read request or a write request, comprising:
      in response to the first I/O request being a read request, dispatching the first I/O request to the first I/O port; and
      in response to the first I/O request being a write request, dispatching the first I/O request to the second I/O port; and
      wherein use of the first I/O port and the second I/O port is enabled to be modified based on a level of I/O requests, and
   reusing at least one of the first I/O port or the second I/O port based on priorities of a read operation and a write operation on the storage device, wherein the reusing comprises:
      receiving a third I/O request, the third I/O request being a write request; and
      in response to determining that the write operation on the storage device has a higher priority than the read operation, dispatching the third I/O request to the first I/O port.

2. The method according to claim 1, wherein the reusing comprises:
   receiving a second I/O request, the second I/O request being a read request; and
   in response to determining that the read operation on the storage device has a higher priority than the write operation, dispatching the second I/O request to the second I/O port.

3. The method according to claim 1, further comprising:
   determining performances of I/O paths associated with a plurality of I/O ports of the storage device; and
   selecting at least one of the first I/O port or the second I/O port, based on the performances of the I/O paths.

4. The method according to claim 3, wherein selecting at least one of the first I/O port or the second I/O port comprises:
   in response to a read operation on the storage device having a higher priority than a write operation, selecting, from the plurality of I/O ports, an I/O port associated with an I/O path having a higher performance as the first I/O port.

5. The method according to claim 3, wherein selecting at least one of the first I/O port or the second I/O port comprises:
   in response to a write operation of the storage device having a higher priority than a read operation, selecting, from the plurality of I/O ports, an I/O port associated with an I/O path having higher performance as the second I/O port.

6. The method according to claim 3, wherein determining performances of I/O paths associated with a plurality of I/O ports of the storage device comprises:
   determining the performances based on respective hopping levels of the I/O paths.

7. A device for use in cooperation with a storage device, the storage device at least including a first input/output (I/O) port and a second I/O port, the device comprising:
   at least one processing unit;
   at least one memory, the at least one memory being coupled to the at least one processing unit and storing instructions executed by the at least one processing unit, the instructions, when executed by the at least one processing unit, causing the device to:
   receive a first I/O request for the storage device;
   selectively dispatch the first I/O request to the first I/O port or the second I/O port based on whether the first I/O request is a read request or a write request, comprising:
      in response to the first I/O request being a read request, dispatch the first I/O request to the first I/O port; and in response to the first I/O request being a write request, dispatch the first I/O request to the second I/O port; and wherein use of the first I/O port and the second I/O port is enabled to be modified based on a level of I/O requests, and reuse at least one of the first I/O port or the second I/O port based on priorities of a read operation and a write operation on the storage device, wherein the reusing comprises:

receiving a third I/O request, the third I/O request being a write request; and in response to determining that the write operation on the storage device has a higher priority than the read operation, dispatching the third I/O request to the first I/O port.

8. The device according to claim 7, wherein the reusing comprising:

receiving a second I/O request, the second I/O request being a read request; and in response to determining that the read operation on the storage device has a higher priority than the write operation, dispatching the second I/O request to the second I/O port.

9. The device according to claim 7, wherein the instructions, when executed by the at least one processing unit, further causes the device to:

determine performances of I/O paths associated with a plurality of I/O ports of the storage device; and select at least one of the first I/O port or the second I/O port, based on the performances of the I/O paths.

10. The device according to claim 9, wherein selecting at least one of the first I/O port or the second I/O port comprises:

in response to a read operation on the storage device having a higher priority than a write operation, selecting, from the plurality of I/O ports, an I/O port associated with an I/O path having a higher performance as the first I/O port.

11. The device according to claim 9, wherein selecting at least one of the first I/O port or the second I/O port comprises:

in response to a write operation of the storage device having a higher priority than a read operation, selecting, from the plurality of I/O ports, an I/O port associated with an I/O path having higher performance as the second I/O port.

12. The device according to claim 9, wherein determining performances of I/O paths associated with a plurality of I/O ports of the storage device comprises:

determining the performances based on respective hopping levels of the I/O paths.

13. A computer program product for managing an input/output (I/O) of a storage device, the storage device at least including a first I/O port and a second I/O port, the computer program product comprising:

a non-transitory computer readable medium encoded with computer-executable program code for using read signatures in replication, the code configured to enable the execution of:

receiving a first I/O request for the storage device;

selectively dispatching the first I/O request based on whether the first I/O request is a read request or a write request, comprising:

in response to the first I/O request being a read request, dispatching the first I/O request to the first I/O port; and in response to the first I/O request being a write request, dispatching the first I/O request to the second I/O port; and wherein use of the first I/O port and the second I/O port is enabled to be modified based on a level of I/O requests, and reusing at least one of the first I/O port or the second I/O port based on priorities of a read operation and a write operation on the storage device, wherein the reusing comprises:

receiving a third I/O request, the third I/O request being a write request; and in response to determining that the write operation on the storage device has a higher priority than the read operation, dispatching the third I/O request to the first I/O port.

* * * * *